(12) United States Patent
Lindner

(10) Patent No.: US 12,522,447 B2
(45) Date of Patent: Jan. 13, 2026

(54) METHOD AND APPARATUS FOR INSPECTING CONTAINERS FILLED WITH LIQUID

(71) Applicant: KRONES AG, Neutraubling (DE)

(72) Inventor: Peter Lindner, Langquaid (DE)

(73) Assignee: KRONES AG, Neutraubling (DE)

( * ) Notice: Subject to any disclaimer, the term of this patent is extended or adjusted under 35 U.S.C. 154(b) by 159 days.

(21) Appl. No.: 18/391,288

(22) Filed: Dec. 20, 2023

(65) Prior Publication Data
US 2024/0208745 A1    Jun. 27, 2024

(30) Foreign Application Priority Data
Dec. 23, 2022    (DE) .................. 10 2022 134 743.5

(51) Int. Cl.
*B65G 47/74* (2006.01)
*B65G 43/08* (2006.01)

(52) U.S. Cl.
CPC ............ *B65G 47/74* (2013.01); *B65G 43/08* (2013.01); *B65G 2203/0208* (2013.01); *B65G 2203/042* (2013.01)

(58) Field of Classification Search
CPC ................. B65G 47/74; B65G 43/08; B65G 2203/0208; B65G 2203/042
USPC ..................................................... 198/464.1
See application file for complete search history.

(56) References Cited

U.S. PATENT DOCUMENTS

| 6,822,181 | B2 * | 11/2004 | Linton ................. B07C 5/3408 |
| | | | 209/523 |
| 8,401,146 | B2 * | 3/2013 | Vorhees ............. G01N 21/8901 |
| | | | 378/57 |
| 2016/0297661 | A1 | 10/2016 | Goldman et al. |
| 2019/0031383 | A1 * | 1/2019 | Feilloley ................. B65B 43/46 |

FOREIGN PATENT DOCUMENTS

| DE | 202016105126 | 1/2017 | ............... B67C 3/00 |
| DE | 102019215692 | 6/2021 | ............. G01N 21/64 |
| DE | 102021115729 | 12/2022 | |
| EP | 2348303 | 7/2011 | ............. G01N 21/35 |
| WO | 2015159043 | 10/2015 | ......... G01N 21/3577 |

OTHER PUBLICATIONS

EP3889615 (Year: 2021).*

(Continued)

*Primary Examiner* — Gene O Crawford
*Assistant Examiner* — Lester Rushin, III
(74) *Attorney, Agent, or Firm* — HAYES SOLOWAY P.C.

(57) ABSTRACT

A method for inspecting containers filled with liquids, wherein the containers is transported along a predetermined transport path by a transport device, and, wherein in a first identification step, at least one identification element is arranged on the container being inspected and/or an identification element being to the container, and at least one first parameter being detected is based on the identification element, which first parameter is characteristic of the filled container, wherein the at least one parameter is characteristic of the liquid desired in the container, wherein at least one further parameter characteristic of the liquid actually located in the container is determined in an inspection step.

18 Claims, 1 Drawing Sheet

(56) References Cited

OTHER PUBLICATIONS

DE 202016105126 (Year: 2016).*
Search Report issued in German Patent Appln. Serial No. 10 2022 134 743.5, dated Jul. 7, 2023, with machine English Translation, 10 pages.
Extended European Search Report issued in EP Patent Appln. Serial No. 23213969.1-1014, dated May 28, 2024, with machine English translation, 11 pages.

* cited by examiner

METHOD AND APPARATUS FOR INSPECTING CONTAINERS FILLED WITH LIQUID

BACKGROUND OF THE INVENTION

The present invention relates to a method and an apparatus for inspecting containers filled with liquid.

It has long been known from the prior art to check containers filled with liquid in multiple respects, for example for a correct fit of a closure, for a correct filling level, or for correctly applied labels.

Recently, efforts have been made to minimize the features of containers, i.e., printings, labels, and the like, in order to meet environmental protection concerns. For example, it would be desirable to eliminate the labeling of containers in order to save labels but also to facilitate the recycling of such containers.

The disadvantage of these savings is that it is often difficult to determine or validate whether a specific container contains the provided liquid. For example, it is known from the internal prior art of the applicant that a code, for example a multidimensional code, is applied to a container and not a label. The container contents are encoded into the matrix code and can be checked and/or read out, for example, via a portable apparatus.

It can be assumed that this type of marking will also be used for other products in the future, for example for sweetened beverages.

However, it is currently not possible in the prior art to verify, after filling and closing, which liquid is actually located in the container. In the case of certain containers, it is also not apparent from the outside what type of liquid is located therein, for example carbonated water or lemonade.

It is known from DE 10 2019 215 692 84 to inspect a product that has already been filled. US 2019/0031383 A1 describes a method for producing containers with marking of the containers.

The object of the present invention is therefore to carry out verification with regard to the filled beverage or a filled liquid even in the case of minimally or lightly equipped containers.

SUMMARY OF THE INVENTION

In a method according to the invention for inspecting containers filled with liquid, said containers are transported along a predetermined transport path by means of a transport device, and, in an identification step, at least one identification element arranged on the container is inspected and/or applied (or attached).

On the basis of this identification element, at least one first parameter is detected that is characteristic of said filled container. This at least one parameter is characteristic of the liquid desired in the container. The first identification element can be arranged on the container itself and/or on an element arranged on the container, such as in particular, but not exclusively, a container closure, preferably having a tamper-evident element.

According to the invention, at least one (further) parameter characteristic of the liquid actually located in the container is determined in an inspection step.

In this case, it is possible for an identification element already located on the container to be inspected (and thus for the container to be identified).

However, it would also be possible for an identification element or an element having an identification element to be attached to the container, for example a container closure that has such an identification element. In this case too, after the identification element has been attached to the container, said identification element is known (without having to be read out again).

Therefore, a feature such as a closure is used to determine which liquid is to be located in said container. Subsequently or another method step, it is verified whether said liquid is actually located in the container.

Thus, this first parameter, which is characteristic of the liquid, can be obtained from the identification element, but it does not yet guarantee that this liquid is actually located in the container. Therefore, a parameter that is characteristic of the liquid is preferably determined twice, wherein in principle the first parameter is characteristic of a "target liquid," and the second parameter is characteristic of the liquid actually located in the container, i.e., an "actual liquid."

The container is preferably a beverage container, a container for medical or healthcare applications or a container for the pharmaceutical sector.

The liquid is in particular a beverage, a medicine or a healthcare product.

The identification element can preferably be identified without contact and in particular optically. Particularly preferably, the identification element uniquely identifies the container.

It is thus proposed to carry out an identification on the container and in particular the already filled and closed container. In this case, it is initially conceivable for a readability check of the identification element, for example a matrix code, to be performed in a first step. In this case, the data read out, for example the type of product, a best-before date, a fill-line related data, and the like, as described in more detail below, is preferably checked for validity.

In a further step, the result of the check of the identification element is verified, particularly preferably using an inspection system, i.e., in particular using an independent inspection system that determines the content of the container.

In this case, the identification element is preferably first read out (or a known identification element is arranged on the container) on the method side and the liquid is then verified. However, it would also be conceivable to first determine the second parameter, which is characteristic of the liquid actually located in the container, and only subsequently read out the first identification element (or arrange the identification element on the container). It would also be possible for the first and the second parameters to be recorded substantially simultaneously.

In a further preferred method step, it is therefore checked whether the liquid desired in the container corresponds to the liquid actually located in the container. For this purpose, the first and second parameters can be compared to each other.

For example, it can be determined based on the identification element that there should be still water in the container. In a further step, for example, the actual nature of the product can be determined spectroscopically and, in particular, it can be determined whether the results of the second inspection also allow the conclusion to be drawn that still water is actually located in the container.

In a further preferred method, the check whether the liquid desired in the container corresponds to the liquid actually contained in the container is carried out using the first and the second parameter.

In a further preferred method, the further parameter characteristic of the liquid actually located in the container is determined by inspecting the liquid.

In particular, this can be an optical inspection and in particular a contactless inspection. In this case, it is possible for the liquid to be inspected in a transmitted-light method. In particular, the liquid already contained in the container is inspected, and in particular this inspection is carried out without any substance affecting the container and in particular without the said container being opened again.

In a further preferred method, the further parameter characteristic of the liquid actually located in the container is determined by means of a sensor device that is selected from a group of sensor devices that includes color sensor devices, spectroscopic devices, laser interferometry devices, and the like.

In a further preferred method, the identification step and the inspection step are temporally offset relative to one another, and in particular the inspection step is carried out after the first identification step.

In a further preferred method, the container is discharged from the container stream if it is determined that the liquid desired in the container does not correspond to the liquid actually located in the container.

In this case, such a discharge is possible if the liquids do not actually correspond to one another, i.e., the "target liquid" does not correspond to the "actual liquid."

The reason may be that, for example, a wrong beverage has been filled, for example water instead of lemonade. In addition, however, a discharge can also occur if the actually inspected container or the inspected liquid is not within certain limits. In this case, it is possible that, for example, water having certain chemical properties should be located in the container as intended, and during the actual inspection it is found that the actual properties of the liquids deviate from the target properties.

In a preferred method, the discharge takes place through a downstream discharge device that allows individual containers to be discharged.

In a further preferred method, the containers are transported in a straight line. In a further preferred method, the containers are transported in a single row. Particularly preferably, the containers to be discharged are ejected laterally from the transport stream.

In a further preferred method, the containers are transported individually, i.e., said containers preferably have a predetermined distance from one another in the transport direction. Particularly preferably, said predetermined distance is greater than half the container diameter, preferably greater than the full container diameter.

Particularly preferably, said distance is less than five times the container diameter, preferably less than four times the container diameter, preferably less than three times the container diameter, and preferably less than twice the container diameter. Said distances have proven to be particularly preferred for carrying out the second inspection step.

In a further preferred method, the identification step is triggered by a trigger device. A light barrier can thus be provided that triggers the first inspection step. As mentioned above, the identification step can also be a first inspection step in which the identification element is inspected.

In a further preferred method, the (second) inspection step is triggered by a trigger device. A light barrier can thus be provided that triggers the (second) inspection step.

Particularly preferably, at least two and preferably a plurality of parameters are detected based on the identification element, which parameters are characteristic of the container and/or the liquid located therein.

In this case, the parameters are preferably characteristic of a property selected from a group of properties that includes fill-line related data, best-before data, and the like.

In a further preferred method, the parameters are at least partially compared with stored data. The stored data can be stored in a machine control, for example, in a treatment receipt, in a cloud or the like. In this way, it can be determined whether, for example, a correct best-before date is specified and the like.

In a further preferred method, the parameters determined from the information element are stored at least temporarily in a cloud or the like. Said parameters are preferably assigned to the inspected container. Particularly preferably, each container is individualized with a unique code.

In a further method according to the invention, the identification element is selected from a group of identification elements that includes barcodes, matrix codes, smart labels, color-coded closures, and the like.

In a further preferred method, the identification element is arranged on a container closure of the container. In particular, the identification element is arranged on an upper side of the container closure. Preferably, the containers are inspected from above the containers.

In a further preferred method, the identification element is identified before application to the container. Particularly preferably, there is a unique, fixed assignment of machine pitch to closure element.

The present invention is further directed to an apparatus for inspecting containers filled with liquids, which apparatus has a transport device that transports the containers along a predetermined transport path and/or along a predetermined transport direction. Furthermore, the apparatus has an identification device that is suitable and intended for inspecting an identification element arranged on the container or for attach an identification element to the container, wherein at least one first parameter can be detected and/or determined based on said identification element, which parameter is characteristic of said filled container, wherein the at least one parameter is characteristic of the liquid desired in the container.

According to the invention, the apparatus has an inspection device that is suitable and intended for determining at least one further parameter characteristic of the liquid actually located in the container.

In a further advantageous embodiment, the apparatus has an evaluation device that is suitable and intended for checking, on the basis of the first parameter and the second parameter, whether the liquid desired in the container corresponds to the liquid located in the container. In this case, said evaluation device can have a comparison device that compares the first parameter (or data derived from said first parameter) to the second parameter (or data derived from said second parameter).

In a further advantageous embodiment, the apparatus has a discharge device that is suitable and intended for discharging individual containers from the transport stream of the containers.

Particularly preferably, the transport device transports the containers along a straight direction. Particularly preferably, the transport device has a conveyor belt on which the containers are preferably transported upright.

In a further advantageous embodiment, the second inspection device has a sensor device that is selected from a group of sensor devices that includes color sensor devices, spectroscopic devices, laser interferometry devices, and the like.

The present invention is further directed to a container, wherein said container is filled with a liquid and in particular a beverage and is closed with a closure. An identification element is arranged on the container and/or the closure, which identification element identifies said container and wherein at least one first parameter can be detected based on said identification element, which parameter is characteristic of said filled container, wherein the at least one parameter is also characteristic of the liquid desired in the container.

According to the invention, a main body of the container is designed without a label and/or imprint, in such a way that the liquid located in the container can be inspected and in particular can also be inspected independently of a rotational position of the container with respect to its longitudinal direction.

Further advantages and embodiments can be seen in the accompanying drawings:

DETAILED DESCRIPTION OF THE INVENTION

Figure 1:
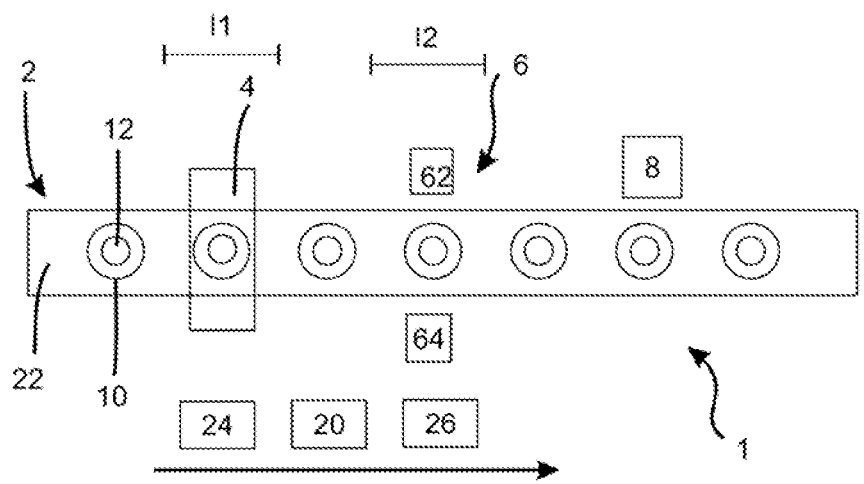
FIG. 1 shows a schematic view of an apparatus according to the invention.

FIG. 1 shows an apparatus 1 according to the invention for inspecting containers 10 filled with liquids. In this case, reference sign 2 refers to a transport device that transports the containers along a transport path or a transport direction T, which in this case is preferably straight. For this purpose, the transport device 2 preferably has a transport belt 22 on which the containers 10 are transported upright. Reference sign 12 designates an identification element arranged on the containers 10, such as a matrix code.

Reference number 4 designates an identification device that, within the scope of a first identification step 11, inspects the containers and in particular reads out the identification element 12. Alternatively or additionally, said identification device can also apply an identification element to each of the containers. In this case, it is possible for the identification device to apply closures provided with the identification elements to the containers, for example. It would also be conceivable for the identification device to apply, for example print, the identification element onto the containers and/or the closures thereof.

In this way, data relating to the container 10 can be read out and/or determined, for example a best-before date or data that is characteristic of the liquid located in the container. This information is preferably stored in a storage device 24.

Reference sign 6 designates an inspection device that is used to inspect the liquid in the containers 10 during a second inspection step 12. However, said second inspection device 6 preferably has a transmission device 62 that emits radiation and a receiving device 64 that receives the radiation transmitted through the containers 10.

For example, as mentioned above, this can be a spectroscopy device. The liquid in the containers 10 can be inspected by means of said second inspection device 6.

Reference sign 26 designates a comparison device that compares the liquid found in the container with the liquid that is to be located in the container based on the identification element 12. If these liquids correspond, the container can be transported further for further processing. If a deviation is detected, a discharge device 8 can discharge the corresponding container from the transport stream.

Figure 2:
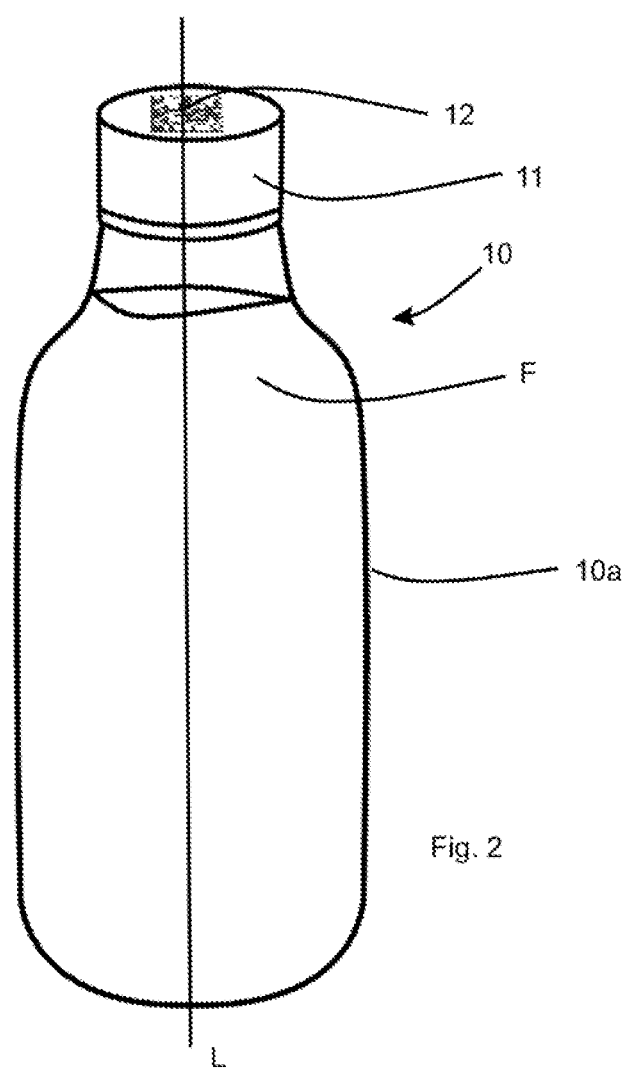
FIG. 2 shows a schematic view of a container.

FIG. 2 shows a representation of a container. Said container has a container closure 11 on which an identification element 12, such as a matrix code, is arranged. Reference sign L designates a longitudinal direction of the container 10.

The container also has a main body 10a, which forms the receiving volume for a liquid F. In addition, a label is usually arranged on these containers in the prior art. Within the scope of the invention, it is proposed to dispense with this label so that the container can also be inspected independently of its direction of rotation using the inspection device 6 shown in FIG. 1.

Particularly preferably, the container is a container made of a material that is transparent to light. In particular, the container is a plastic container or a glass container.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A method for inspecting containers filled with liquids, wherein the containers are transported by a transport device along a predetermined transport path past a first inspection device, and, wherein in a first identification step, at least one identification element arranged on the container is inspected and/or an identification element is attached or applied to the container in the first identification step, and at least one first parameter is detected based on said identification element, which the at least one first parameter is characteristic of said filled container, wherein said at least one first parameter is characteristic of the liquid desired in the container,
wherein
at least one further parameter characteristic of the liquid actually located in the container is determined in a second inspection step, and
wherein
the second inspection whether the liquid desired in the container corresponds to the liquid actually located in the container is carried out using the first parameter and the second parameter.

2. The method according to claim 1,
wherein
the inspection includes a check whether the liquid desired in the container corresponds to the liquid actually located in the container.

3. The method according to claim 1,
wherein
a further parameter characteristic of the liquid actually located in the container is determined by inspecting the liquid.

4. The method according to claim 1,
wherein
the further parameter characteristic of the liquid actually located in the container is determined by a sensor device that is selected from a group of sensor devices consisting of a color sensor device, a spectroscopic device, and a laser interferometry device.

5. The method according to claim 1,
wherein
the identification step and the inspection step are carried out temporally offset relative to one another, and the inspection step is carried out after the identification step.

6. The method according to claim 1,
wherein
a container is discharged from a container stream if it is determined that the liquid desired in the container does not correspond to the liquid actually located in the container.

7. The method according to claim 1,
wherein
at least two parameters that are characteristic of the container are detected based on the identification element.

8. The method according to claim 7,
wherein
the parameters are characteristic of a property selected from a group of properties selected from fill-line related data, and best-before data.

9. The method according to claim 8,
wherein
the further parameters are compared with stored data, wherein the stored data is stored in an LMS, in a receipt and/or in a storage device and/or in a cloud.

10. The method according to claim 1,
wherein
the identification element is selected from a group of identification elements consisting of a barcode, a matrix code, a smart label, and a color-coded closure, and/or in that the identification element is arranged on a container closure of the container.

11. An apparatus for inspecting containers filled with liquids having a transport device configured to transport the containers along a predetermined transport path, having an identification device that is configured for identifying an identification element arranged on the container, and/or for attaching an identification element to the container, wherein at least one first parameter is detectable based on said identification element, which at least one first parameter is characteristic of said filled container, wherein the at least one first parameter is characteristic of the liquid desired in the container,
wherein
the apparatus has an inspection device that is configured for determining at least one further parameter characteristic of the liquid actually located in the container, and the inspection whether the liquid desired in the container corresponds to the liquid actually located in the container is carried out using the first parameter and the second parameter.

12. The apparatus according to claim 11,
wherein
the apparatus has an evaluation device that is configured for checking, on the basis of the first parameter and the second parameter, whether the liquid desired in the container corresponds to the liquid located in the container.

13. The apparatus according to claim 11,
wherein
the inspection device has a sensor device that is selected from a group of sensor devices consisting of a color sensor device, a spectroscopic device, and a laser interferometry devices.

14. The method according to claim 1,
wherein
the result of the check of the identification element is verified.

15. The method according to claim 1,
wherein
the discharge takes place through a downstream discharge device that allows individual containers to be discharged.

16. The method according to claim 1,
wherein
the identification step is triggered by a trigger device.

17. The method according to claim 1,
wherein
the second parameter is determined first, which is characteristic of the liquid actually located in the container, and only subsequently read out the first identification element.

18. The method according to claim 1,
wherein
the first and second parameters are recorded simultaneously.

* * * * *